United States Patent
Oh et al.

(10) Patent No.: US 9,024,245 B2
(45) Date of Patent: May 5, 2015

(54) IMAGE SENSOR APPARATUS USING SHADED PHOTODETECTOR FOR TIME OF FLIGHT DETERMINATION

(75) Inventors: Min-Seok Oh, Osan-si (KR); Moo-Sup Lim, Yongin-si (KR); Jung-Chak Ahn, Yongin-si (KR); Eun-Sub Shim, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 281 days.

(21) Appl. No.: 13/612,904

(22) Filed: Sep. 13, 2012

(65) Prior Publication Data

US 2013/0062500 A1    Mar. 14, 2013

(30) Foreign Application Priority Data

Sep. 14, 2011   (KR) ........................ 10-2011-0092499

(51) Int. Cl.
| | |
|---|---|
| *G01S 17/89* | (2006.01) |
| *G01S 7/481* | (2006.01) |
| *G01S 7/486* | (2006.01) |
| *H04N 5/341* | (2011.01) |
| *H04N 5/361* | (2011.01) |
| *H04N 5/3745* | (2011.01) |

(52) U.S. Cl.
CPC ............... *G01S 17/89* (2013.01); *G01S 7/4816* (2013.01); *G01S 7/4865* (2013.01); *H04N 5/341* (2013.01); *H04N 5/361* (2013.01); *H04N 5/3745* (2013.01)

(58) Field of Classification Search
CPC ..... H04N 5/335; H04N 5/3355; H04N 5/357; H04N 5/359; H04N 5/361

USPC ........ 250/208.1, 214 R, 214.1; 348/292–311; 257/290–292, 440; 356/4.01, 5.01, 356/5.06, 215, 218, 222

See application file for complete search history.

(56) References Cited

U.S. PATENT DOCUMENTS

| | | |
|---|---|---|
| 7,573,012 B1 * | 8/2009 | Huang et al. ................... 250/205 |
| 7,843,029 B2 | 11/2010 | Kawahito et al. |
| 2006/0192938 A1 | 8/2006 | Kawahito |
| 2007/0158770 A1 | 7/2007 | Kawahito |
| 2007/0182949 A1 | 8/2007 | Niclass |
| 2013/0026384 A1 * | 1/2013 | Kim et al. ...................... 250/393 |
| 2013/0228691 A1 * | 9/2013 | Shah .......................... 250/341.8 |

FOREIGN PATENT DOCUMENTS

| | | |
|---|---|---|
| JP | 2004-294420 A | 10/2004 |
| JP | 2005-235893 A | 9/2005 |

* cited by examiner

*Primary Examiner* — Georgia Y Epps
*Assistant Examiner* — Carolynn A Moore
(74) *Attorney, Agent, or Firm* — Myers Bigel Sibley & Sajovec, P.A.

(57) ABSTRACT

A unit pixel for an image sensor includes an accumulation circuit configured to generate an accumulated dark current by accumulating a charge corresponding to a dark current during a time of flight (TOF), the accumulation circuit being optically shaded to generate the dark current, an output voltage generation circuit configured to generate and output an output voltage corresponding to the TOF based on a charge corresponding to the accumulated dark current, a control circuit configured to control an operation of the output voltage generation circuit based on a light signal that is input to the unit pixel after being reflected by an object, the light signal being emitted by a light source, and an initialization circuit configured to initialize the accumulation circuit at a predetermined cycle.

20 Claims, 12 Drawing Sheets

IMAGE SENSOR APPARATUS USING SHADED PHOTODETECTOR FOR TIME OF FLIGHT DETERMINATION

CROSS-REFERENCE TO RELATED APPLICATION(S)

This application claims priority under 35 USC §119 to Korean Patent Application No. 10-2011-0092499, filed on Sep. 14, 2011 in the Korean Intellectual Property Office (KIPO), the contents of which are incorporated herein in its entirety by reference.

BACKGROUND

1. Technical Field

Example embodiments relate generally to image sensors and, more particularly, to time of flight (TOF) type three-dimensional (3D) image sensors.

2. Description of the Related Art

An image sensor is a semiconductor device that transforms a light signal input from outside to an electric signal (i.e., performs photoelectric transformations) to provide image information corresponding to the light signal. Recently, a three-dimensional (3D) image sensor that provides distance information as well as the image information based on the light signal has been suggested. Typically, the 3D image sensor may measure a distance between each unit pixel and an object by measuring a time of flight (TOF) that corresponds to an elapsed time during which an optical pulse (i.e., a laser pulse) is emitted toward the object by a light source, and then input to the unit pixel after being reflected by the object. However, a conventional 3D image sensor may need a time to digital converter (TDC) for measuring the TOF for each unit pixel, and each unit pixel of the conventional 3D image sensor may need a light sensing device having a relatively high sensitivity. Therefore, it may be difficult to manufacture a conventional 3D image sensor with a small size, and manufacturing cost and power consumption of the conventional 3D image sensor may be relatively large.

SUMMARY

Some example embodiments provide a unit pixel for an image sensor, the unit pixel including a photodetector and a time of flight (TOF) signal generator circuit configured to initiate accumulation of a current of the photodetector responsive to transmission of a light pulse, to receive light corresponding to the transmitted light pulse and to responsively generate an output voltage that is indicative of TOF based on the accumulation of the current of the photodetector. In some embodiments, the TOF signal generator circuit may include an accumulation circuit configured to generate a measure of accumulation of the current of the photodetector, an initialization circuit coupled to the accumulation circuit and configured to initialize accumulation of the current, an output voltage generation circuit coupled to the accumulation circuit and configured to generate the output voltage based on the measure of accumulation and a control circuit configured to receive light and to responsively control the output voltage generation circuit such that the output voltage is indicative of TOF of the received light. The photodetector may include an optically shaded photodiode and the current may include a dark current or a leakage current.

In some embodiments, the initialization circuit may include a first transistor configured to couple the photodiode to a power supply node responsive to a signal indicative of transmission of light. The output voltage generation circuit may include a second transistor configured to transfer charge from a node of the photodiode responsive to a control signal from the control circuit and a third transistor configured to generate the output voltage responsive to the transferred charge. The control circuit may include a light sensing device configured to activate the control signal responsive to receiving light. The light sensing device may include a Geiger-mode avalanche photodiode (GAPD) or a linear-mode avalanche photodiode (LAPD).

Further embodiments of the inventive subject matter provide an image sensor apparatus including an optically shaded photodiode associated with a unit pixel and a control circuit configured to initialize the photodiode responsive to a first control signal indicative of transmission of a light pulse and to generate, responsive to a second control signal indicative of receipt of reflected light corresponding to the transmitted light pulse, an output voltage based on a state of the photodiode. The control circuit may be configured to charge a node of the photodiode responsive to the first control signal and, responsive to the second control signal, to charge a capacitor based on a state of the node of the photodiode.

In some embodiments, the control circuit may include an initialization transistor configured to couple the node of the photodiode to a power supply node responsive to the first control signal, a transfer transistor configured to couple the node of the photodiode to a floating node responsive to the second control signal and a charging transistor configured to couple the capacitor to the power supply node based on a state of the floating node.

The apparatus may further include a time of flight (TOF) estimating circuit configured to receive the output voltage and to responsively generate a signal indicative of TOF. The TOF estimating circuit may be configured to map values for the output voltage to TOF values. In some embodiments, the TOF estimating circuit is configured to receive respective output voltages from respective ones of a plurality of unit pixels, to generate a mean output voltage from the output voltages and to map values of the mean output voltage to TOF values.

In further embodiments, the TOF estimating circuit may include a comparison circuit configured to compare the output voltage to a reference voltage for an optical black region and to generate the signal indicative of TOF responsive to the comparison. The TOF estimating circuit may be configured to receive respective output voltages from respective ones of a plurality of unit pixels, to generate a mean output voltage from the output voltages, to compare the mean output voltage to a reference voltage for an optical black region and to generate the signal indicative of TOF responsive to the comparison.

In some embodiments of the inventive subject matter, an apparatus includes a pixel array including a plurality of unit pixels. Each of the unit pixels includes an optically shaded photodiode and a control circuit configured to initialize the photodiode responsive to a first control signal indicative of transmission of a light pulse and to generate, responsive to a second control signal indicative of receipt of reflected light corresponding to the transmitted light pulse, an output voltage based on a state of the photodiode. Each control circuit may be configured to accumulate a dark current or a leakage current of the photodiode and to generate the output voltage responsive to the accumulation.

Each control circuit may include an initialization transistor configured to couple the node of the photodiode to a power supply node responsive to the first control signal, a transfer transistor configured to couple the node of the photodiode to a floating node responsive to the second control signal and a charging transistor configured to coupled the capacitor to the power supply node based on a state of the floating node.

The apparatus may further include a time of flight (TOF) estimating circuit configured to receive the output voltages from the unit pixels.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
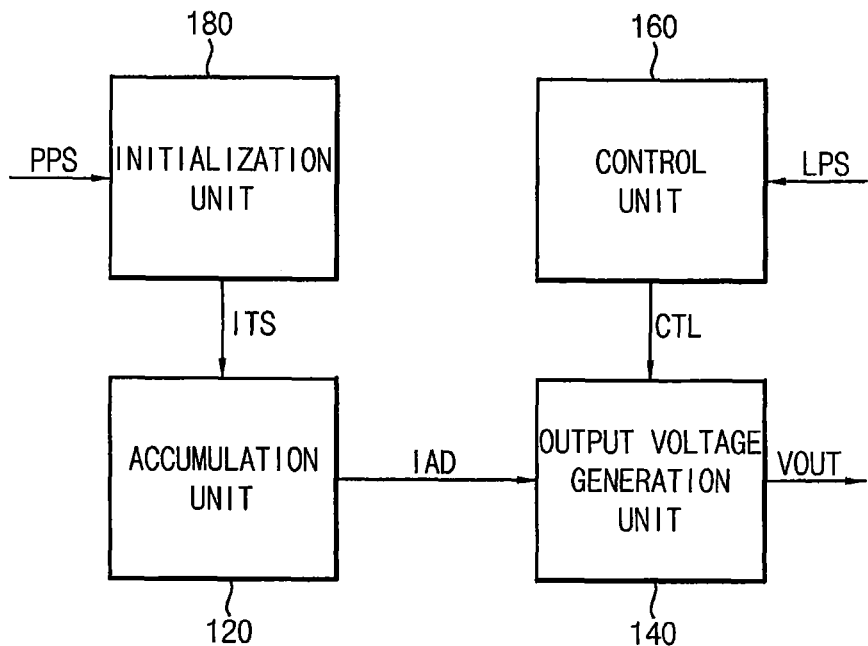
FIG. 1 is a block diagram illustrating a unit pixel of a three-dimensional (3D) image sensor according to some example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a unit pixel of a three-dimensional (3D) image sensor according to some example embodiments.

Referring to FIG. 1, the unit pixel 100 of the 3D image sensor may include an accumulation circuit 120, an output voltage generation circuit 140, a control circuit 160, and an initialization circuit 180.

The accumulation circuit 120 may be optically shaded to generate a dark current. Thus, the accumulation circuit 120 may accumulate (i.e., integrate) dark current to generate an accumulated dark current IAD by accumulating the dark current (i.e., charge corresponding to the dark current) during a time of flight (TOF). The TOF may be an elapsed time during which a light signal LPS is emitted toward an object by a light source, and then input to the unit pixel 100 after being reflected by the object. The accumulation circuit 120 may provide the accumulated dark current IAD to the output voltage generation circuit 140 when the light signal LPS is input to the unit pixel 100. According to some example embodiments, the light source may be an optical pulse emission device, and the light signal LPS may be an optical pulse. For example, the light source may correspond to a laser diode, and the light signal LPS may correspond to a laser pulse.

In some example embodiments, the accumulation circuit 120 may include a photodiode that generates the dark current when being optically shaded. Thus, the photodiode of the accumulation circuit 120 may be optically shaded from the light signal LPS. Therefore, a shading layer or a bulk color filter layer may be formed over the accumulation circuit 120. Generally, a photoelectric device such as the photodiode generates the dark current based on certain factors (e.g., a temperature) without any light input from outside. Hence, the unit pixel 100 may use the dark current generated by the photodiode of the accumulation circuit 120 in order to calculate the TOF.

Since a magnitude of the dark current generated by the photodiode of the accumulation circuit 120 varies according to a temperature, the unit pixel 100 may be maintained at a specific temperature by a heat reservoir that is attached to a unit pixel array. As a result, a plurality of unit pixels 100 included in the unit pixel array may operate at the same temperature, such that dark current characteristics of the photodiodes included in the unit pixels 100 may be substantially the same. Hence, a reliability of 3D image sensing operations may be improved. In addition, the accumulation circuit 120 may be initialized on a predetermined cycle by the initialization circuit 180. Therefore, the accumulation circuit 120 may newly generate the accumulated dark current IAD on the predetermined cycle.

The output voltage generation circuit 140 may generate and output an output voltage VOUT corresponding to the TQF based on the accumulated dark current IAD input from the accumulation circuit 120. Since the accumulated dark current IAD is proportional to a time in which the dark current is accumulated, and the output voltage VOUT is proportional to the accumulated dark current IAD, the TOF may be substantially proportional to the accumulated dark current IAD. Thus, the TOF may be calculated based on the output voltage VOUT output from the output voltage generation circuit 140. For example, the TOF may be calculated using a mapping table that includes information related to a relation between the output voltage VOUT and the TOF.

In some example embodiments, the output voltage generation circuit 140 may include a second transistor that transfers charge indicative of the accumulated dark current IAD based on a control signal CTL input from the control circuit 160, and a third transistor that generates the output voltage VOUT based on the transferred charge corresponding to the accumulated dark current IAD. When the TOF is calculated based on the output voltage VOUT, a distance D between the unit pixel 100 and the object may be calculated as D=(c×TOF)/2, where c denotes the velocity of light, 3*10^8 m/s. However, a method of calculating the distance D between the unit pixel 100 and the object is not limited thereto.

The control circuit 160 may control an operation of the output voltage generation circuit 140 in response to the light signal LPS that is input to the unit pixel 100 after being reflected by the object. The control circuit 160 may control an operation of the output voltage generation circuit 140 by outputting the control signal CTL to the output voltage generation circuit 140. For example, when the control signal CTL is activated (i.e., in an activated state), the output voltage generation circuit 140 may generate the output voltage VOUT. When the control signal CTL is deactivated (i.e., in a deactivated state), the output voltage generation circuit 140 may not generate the output voltage VOUT. The control signal CTL may be triggered when the light signal LPS is input to the unit pixel 100. In other words, the control signal CTL may be maintained in a deactivated state, and then may be activated when the light signal LPS is input to the unit pixel 100.

In some example embodiments, the control circuit 160 may include a light sensing device that activates the control signal CTL when the light signal LPS is input to the unit pixel 100. The light sensing device may be Geiger-mode avalanche photodiode (GAPD), or linear-mode avalanche photodiode (LAPD). However, the light sensing device is not limited thereto.

The initialization circuit 180 may initialize the accumulation circuit 120 by outputting an initialization signal ITS on the predetermined cycle. As a result, the accumulation circuit 120 may newly generate the accumulated dark current IAD on the predetermined cycle. Although it is illustrated in FIG. 1 that the accumulation circuit 120 is initialized by the initialization signal ITS output from the initialization circuit 180, it should be understood that the accumulation circuit 120 may be initialized by a circuit connection between the accumulation circuit 120 and the initialization circuit 180. In some example embodiments, the initialization circuit 180 may include a first transistor that turns-on on the predetermined cycle to initialize the accumulation circuit 120. In this case, the initialization control signal PPS may be triggered on the predetermined cycle. In other words, the initialization control signal PPS may be in a deactivated state, and then may be activated on the predetermined cycle to turn-on the first transistor.

As described above, the unit pixel 100 may measure the TOF based on the dark current that is generated by the photodiode of the accumulation circuit 120 based on certain factors (e.g., a temperature). The photodiode may be optically shaded to generate the dark current. The unit pixel 100 may have a structure that is similar to a structure of a unit pixel included in a typical image sensor. However, in the structure of the unit pixel 100, a photodiode (i.e., a photoelectric device) is optically shaded, and a light sensing device is coupled to a gate terminal of a transfer transistor. Thus, compared to a conventional 3D image sensor, a 3D image sensor having the unit pixel 100 may not need a light sensing device having a relatively high sensitivity, and a time to digital converter for measuring the TOF for each unit pixel. As a result, the 3D image sensor having the unit pixel 100 may have a simplified structure, and thus may be manufactured in a small size. In addition, the 3D image sensor having the unit pixel 100 may reduce manufacturing cost and power consumption.

Figure 2:
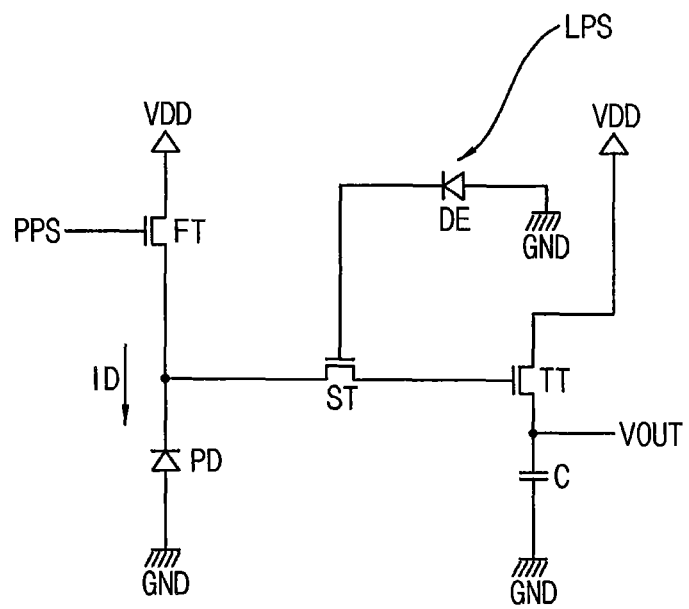
FIG. 2 is a circuit diagram illustrating an example of a unit pixel of FIG. 1.

FIG. 2 is a circuit diagram illustrating an example of a unit pixel of FIG. 1. Referring to FIG. 2, the unit pixel 100 may include a photodiode PD, a first transistor FT, a second transistor ST, a third transistor TT, a capacitor C, and a light sensing device DE. However, a structure of the unit pixel 100 is not limited thereto.

photodiode PD may correspond to the accumulation circuit 120 of the unit pixel 100. A first terminal of the photodiode PD may be coupled to a first terminal of the first transistor FT. A second terminal of the photodiode PD may be coupled to a ground voltage GND. The accumulated dark current IAD may be generated by accumulating the dark current ID at the first terminal of the photodiode PD (i.e., charge present at this node of the photodiode PD provides a measure of the amount of dark current of the photodiode PD over a certain amount of time). The first transistor FT may correspond to the initialization circuit 180 of the unit pixel 100. A first terminal of the first transistor FT may be coupled to the first terminal of the photodiode PD. A second terminal of the first transistor FT may be coupled to a power supply node VDD. In addition, a gate terminal of the first transistor FT may receive the initialization control signal PPS. In some example embodiments, when the light source (i.e., an optical pulse emission device) emits the light signal LPS (i.e., an optical pulse), the initialization control signal PPS may be triggered in response thereto. As described above, when the initialization control signal PPS is activated, the first transistor FT may turn on, causing the node at which the photodiode PD and the first transistor FT are connected to be charged from the power supply node VDD. Thus, the photodiode PD may be initialized when the initialization control signal PPS is activated. When the initialization control signal PPS is in a deactivated state, the first transistor FT may turn off, thus beginning a period in which dark current of the photodiode PD is accumulated.

A structure having the second transistor ST, the third transistor TT, and the capacitor C may correspond to the output voltage generation circuit 140 of the unit pixel 100. A first terminal of the second transistor ST may be coupled to the first terminal of the photodiode PD. A second terminal of the second transistor ST may be coupled to a gate terminal of the third transistor TT. In addition, a gate terminal of the second transistor ST may be coupled to a first terminal of the light sensing device DE. In example embodiments, the second terminal of the second transistor ST may act as a floating diffusion node by being coupled to an additional capacitor (not illustrated). A first terminal of the third transistor TT may be coupled to a first terminal of the capacitor C. A second terminal of the third transistor TT may be coupled to the power supply node VDD. In addition, a gate terminal of the third transistor TT may be coupled to the second terminal of the second transistor ST. The first terminal of the third transistor TT may correspond to an output terminal at which the output voltage VOUT is output. A first terminal of the capacitor C may be coupled to the first terminal of the third transistor TT. A second terminal of the capacitor C may be coupled to the ground voltage GND. The second transistor ST may turn on when the light signal LPS is input to the light sensing device DE. Thus, the second transistor ST may transfer charge indicative of the accumulated dark current IAD of the first terminal of the photodiode PD to the gate terminal of the third transistor TT. The third transistor TT may turn on based on the transferred charge and may generate the output voltage VOUT using the capacitor C.

The light sensing device DE may correspond to the control circuit 160 of the unit pixel 100. A first terminal of the light sensing device DE may be coupled to the gate terminal of the second transistor ST. A second terminal of the light sensing device DE may be coupled to the ground voltage GND. The light sensing device DE may control the second transistor ST to be maintained in a turn-off state, and then may control the second transistor ST to turn-on when the light signal LPS is input to the light sensing device DE. For this operation, the light sensing device DE may correspond to Geiger-mode avalanche photodiode (GAPD), or linear-mode avalanche photodiode (LAPD). However, the light sensing device DE is not limited thereto. As described above, since the unit pixel 100 has a structure illustrated in FIG. 2, the unit pixel 100 may generate the output voltage VOUT corresponding to the TOF based on the dark current ID generated by the photodiode PD. Meanwhile, although not illustrated in FIG. 2, the accumulation circuit 120 may be optically shaded from the light signal LPS.

Figure 3:
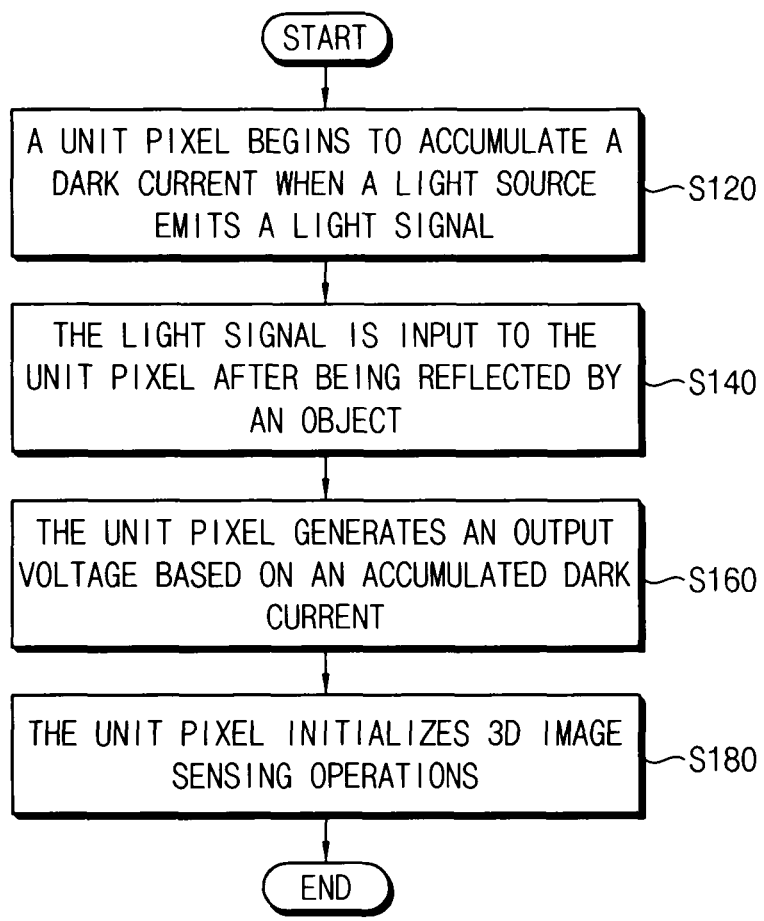
FIG. 3 is a flow chart illustrating an operation of a unit pixel of FIG. 2.

FIG. 3 is a flow chart illustrating an operation of a unit pixel of FIG. 2.

Referring to FIG. 3, the unit pixel 100 may begin to accumulate the dark current ID when the light source (i.e., an optical pulse emission device) emits the light signal LPS (i.e., an optical pulse) (Step S120). In example embodiments, the light source may correspond to a laser diode, and the light signal LPS may correspond to a laser pulse. The unit pixel 100 may generate the accumulated dark current IAD by accumulating the dark current ID generated by the photodiode PD until the light signal LPS is input to the unit pixel 100 after being reflected by the object. When the light signal LPS is input to the unit pixel 100 (Step S140), the unit pixel 100 may generate the output voltage VOUT corresponding to the TOF based on the accumulated dark current IAD (Step S160). Next, the unit pixel 100 may initialize 3D image sensing operations (Step S180), and then may repeat the steps (i.e., Step S120, Step S140, Step S160) or may finish the 3D image sensing operations.

Figure 4:
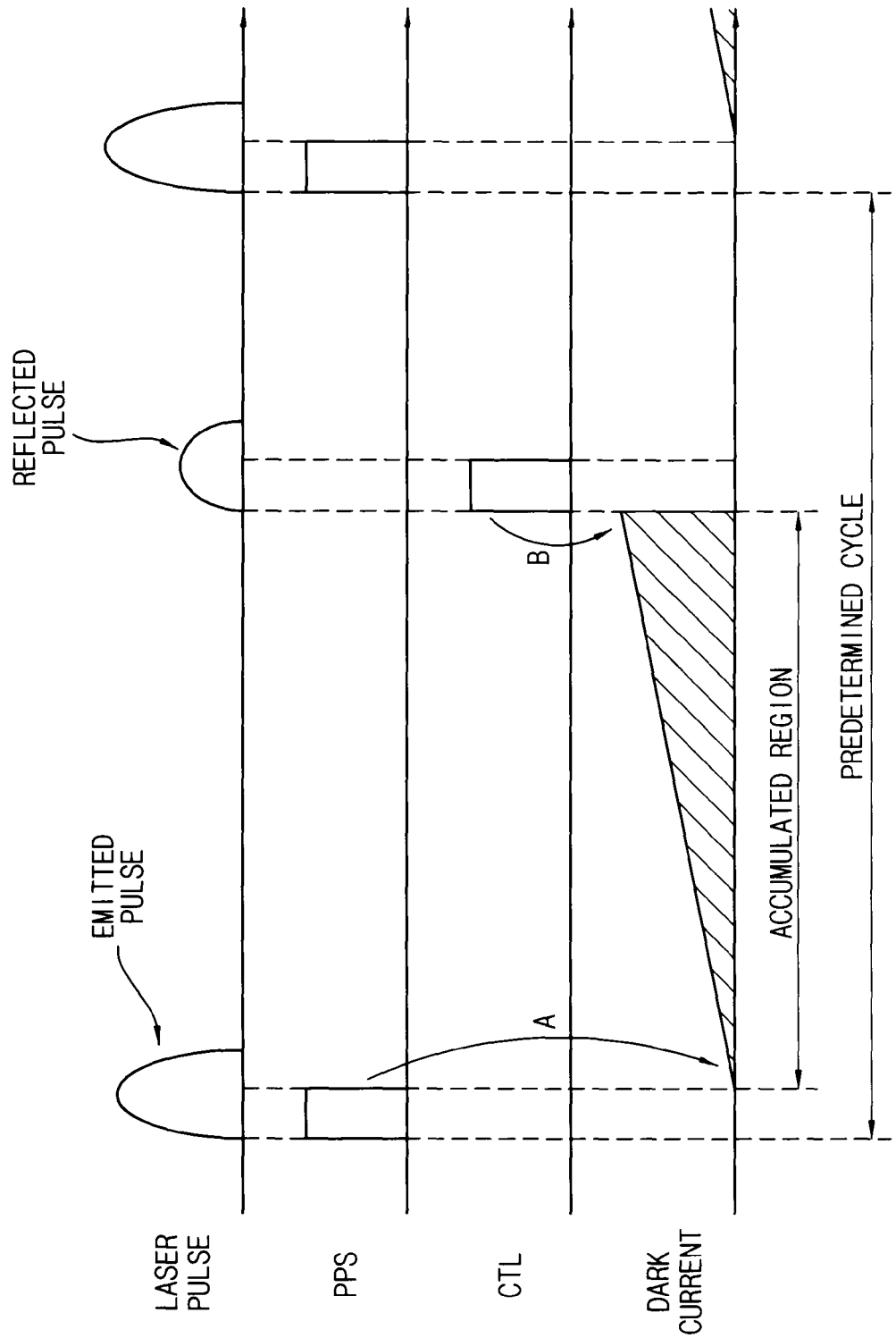
FIG. 4 is a timing diagram illustrating an operation of a unit pixel of FIG. 2.

FIG. 4 is a timing diagram illustrating an operation of a unit pixel of FIG. 2.

Referring to FIG. 4, the light signal LPS (i.e., an optical pulse) emitted by the light source (i.e., an optical pulse emission device) may have a predetermined cycle. As illustrated in FIG. 4, the light source may correspond to a laser diode, and the light signal LPS may correspond to a laser pulse. In detail, when the light signal LPS is emitted toward an object by the light source, the light signal LPS may be input to the unit pixel 100 after being reflected by the object. As illustrated in FIG. 4, when the light signal LPS is emitted by the light source, the initialization control signal PPS may be triggered. The initialization control signal PPS may be maintained in a deactivated state, and then may be activated when the light signal LPS is emitted by the light source. The photodiode PD may be initialized (i.e., indicated as an arrow A) when the initialization control signal PPS is activated. The photodiode PD may generate the accumulated dark current IAD by accumulating the dark current ID. Next, when the light signal LPS is input to the unit pixel 100 after being reflected by the object, the light sensing device DE may activate the control signal CTL. The photodiode PD may stop generating the accumulated dark current IAD (i.e., indicated as an arrow B).

Meanwhile, when the photodiode PD stops generating the accumulated dark current IAD, the unit pixel 100 may generate the output voltage VOUT corresponding to the TOF based on the accumulated dark current IAD. As described above, since the accumulated dark current IAD is proportional to a time during which the dark current ID is accumulated, and the output voltage VOUT is proportional to the accumulated dark current IAD, the TOF may be substantially proportional to the accumulated dark current IAD. Thus, the TOF may be accurately calculated based on the output voltage VOUT output from the unit pixel 100. Next, when the light source emits the light signal LPS again according to the predetermined cycle, the unit pixel 100 may repeat the above process.

Figure 5:
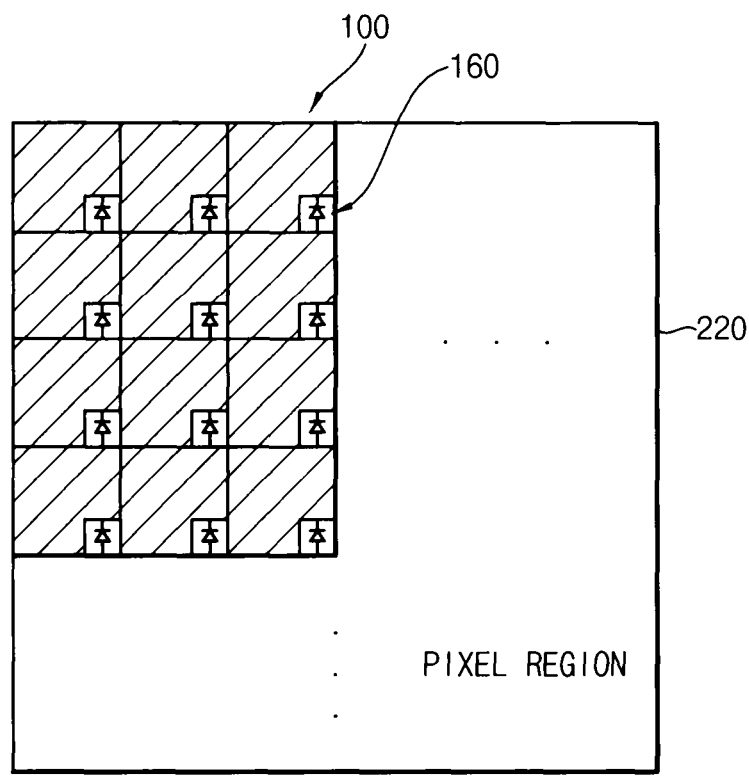
FIG. 5 is a diagram illustrating an example of a unit pixel array including a unit pixel of FIG. 1.

FIG. 5 is a diagram illustrating an example of a unit pixel array including a unit pixel of FIG. 1. Referring to FIG. 5, the unit pixel array 200 may include a pixel region 220, and the pixel region 220 may include a plurality of unit pixels 100.

Each unit pixel 100 may include the accumulation circuit 120 that generates the accumulated dark current IAD by accumulating the dark current ID during the TOF, the output voltage generation circuit 140 that generates and outputs the output voltage VOUT corresponding to the TOF based on the accumulated dark current IAD, the control circuit 160 that controls an operation of the output voltage generation circuit 140 in response to the light signal LPS, the light signal LPS being emitted toward the object by the light source, and then input to each unit pixel 100 after being reflected by the object, and the initialization circuit 180 that initializes the accumulation circuit 120 on a predetermined cycle. Since each unit pixel 100 is described above, duplicated descriptions will be omitted below. As illustrated in FIG. 5, except for the control circuit 160 that receives the light signal LPS, the accumulation circuit 120, the output voltage generation circuit 160, and the initialization circuit 180 may be optically shaded from the light signal LPS in each unit pixel 100.

In some example embodiments, a shading layer or a bulk color filter layer may be formed over the accumulation circuit 120, the output voltage generation circuit 160, and the initialization circuit 180 in each unit pixel 100. In another example embodiment, a shading layer or a bulk color filter layer may be formed over only the accumulation circuit 120 in each unit pixel 100. Meanwhile, when the photodiode PD of each unit pixel 100 generates the dark current ID, a magnitude of the dark current ID may be determined according to a temperature. Thus, it may be desirable that a temperature provided to a plurality of unit pixels 100 be substantially constant in order to accurately generate the output voltage VOUT corresponding to the TOF. Therefore, a heat reservoir may be attached to the unit pixel array 200. Consequently, photodiodes PD in the unit pixels 100 may be maintained at a substantially uniform specific temperature.

Figure 6:
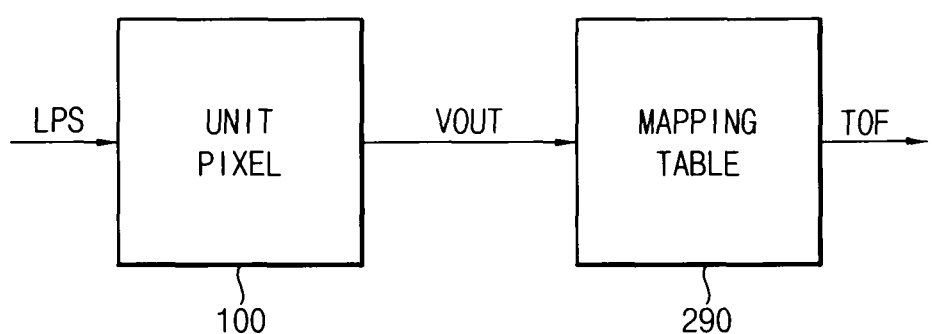
FIG. 6 is a block diagram illustrating an example in which a time of flight (TOF) is calculated in a unit pixel array of FIG. 5.

FIG. 6 is a block diagram illustrating an example in which a time of flight (TOF) is calculated in a unit pixel array of FIG. 5. Referring to FIG. 6, each unit pixel 100 may be coupled to a mapping table 290 in the unit pixel array 200. The mapping table 290 may include information related to a relation between the time of flight TOF and the output voltage VOUT, the output voltage being output from each unit pixel 100. As a result, the time of flight TOF may be calculated based on the output voltage VOUT output from each unit pixel 100. For example, when each unit pixel 100 outputs the output voltage VOUT, the mapping table 290 may select and output the time of flight TOF corresponding to the output voltage VOUT. In some example embodiments, the mapping table 290 may be a memory device that stores information related to a relation between the time of flight TOF and the output voltage VOUT.

In detail, the initialization circuit 180 may initialize the accumulation circuit 120 when the light source (i.e., an optical pulse emission device) emits the light signal LPS (i.e., an optical pulse). In addition, the accumulation circuit 120 may generate the accumulated dark current IAD by accumulating the dark current ID until the light signal LPS is input to each unit pixel 100 after being reflected by an object. The control circuit 160 may control the output voltage generation circuit 140 to generate the output voltage VOUT corresponding to the time of flight TOF when the light signal LPS is input to each unit pixel 100. The mapping table 290 may convert the output voltage VOUT into the time of flight TOF, and may output the time of flight TOF.

Figure 7:
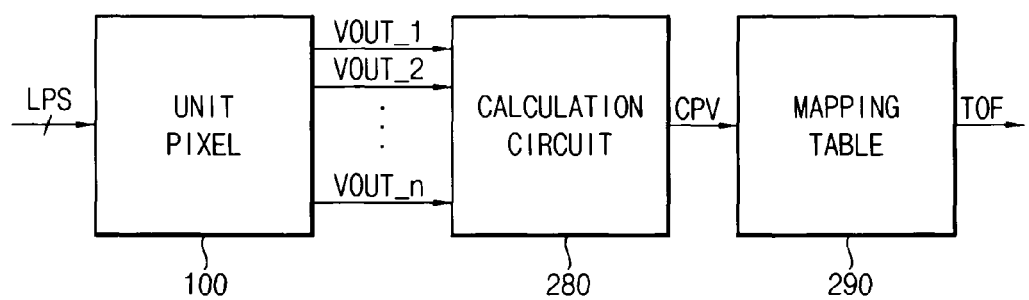
FIG. 7 is a block diagram illustrating another example in which a time of flight (TOF) is calculated in a unit pixel array of FIG. 5.

FIG. 7 is a block diagram illustrating another example in which a time of flight (TOF) is calculated in a unit pixel array of FIG. 5 according to further embodiments. Referring to FIG. 7, a calculation circuit 280 may be located between each unit pixel 100 and a mapping table 290 in order to improve an accuracy of the time of flight TOF. The mapping table 290 may include information related to a relation between the time of flight TOF and a final output voltage CPV, the final output voltage CPV being output from the calculation circuit 280. The calculation circuit 280 may provide the final output voltage CPV to the mapping table 290 by calculating a mean value of first through (n)th output voltages VOUT_1 through VOUT_n. In addition, the mapping table 290 may calculate the time of flight TOF based on the final output voltage CPV output from the calculation circuit 280.

In detail, since the light source (i.e., an optical pulse emission device) emits the light signal LPS (i.e., an optical pulse) on a predetermined cycle, 3D image sensing operations may be performed n times during n cycles. Namely, each unit pixel 100 may sequentially output the first through (n)th output voltages VOUT_1 through VOUT_n during n cycles. Thus, the calculation circuit 280 may temporarily store the first through (n)th output voltages VOUT_1 through VOUT_n output from each unit pixel 100, and may calculate a mean value of the first through (n)th output voltages VOUT_1 through VOUT_n to output the mean value as the final output voltage CPV. The mapping table 290 may convert the final output voltage CPV into the time of flight TOF.

Generally, dark current characteristics of a photodiode PD included in each unit pixel 100 may vary based on certain factors. In addition, a reliability of a mean value of a plurality of values generated by a plurality of 3D image sensing operations may be higher than a reliability of one value generated by one 3D image sensing operation. Thus, if the time of flight TOF is calculated based on the final output voltage CPV, an accuracy of the time of flight TOF may be improved. The number of 3D image sensing operations may be determined according to required conditions. However, as the number of 3D image sensing operations is increased, an operation time may be increased (i.e., although an accuracy of the time of flight TOF is increased). As the number of 3D image sensing operations is decreased, an accuracy of the time of flight TOF may be decreased (i.e., although an operation time is decreased). Therefore, the number of 3D image sensing operations may be determined by considering the above trade-offs.

Figure 8:
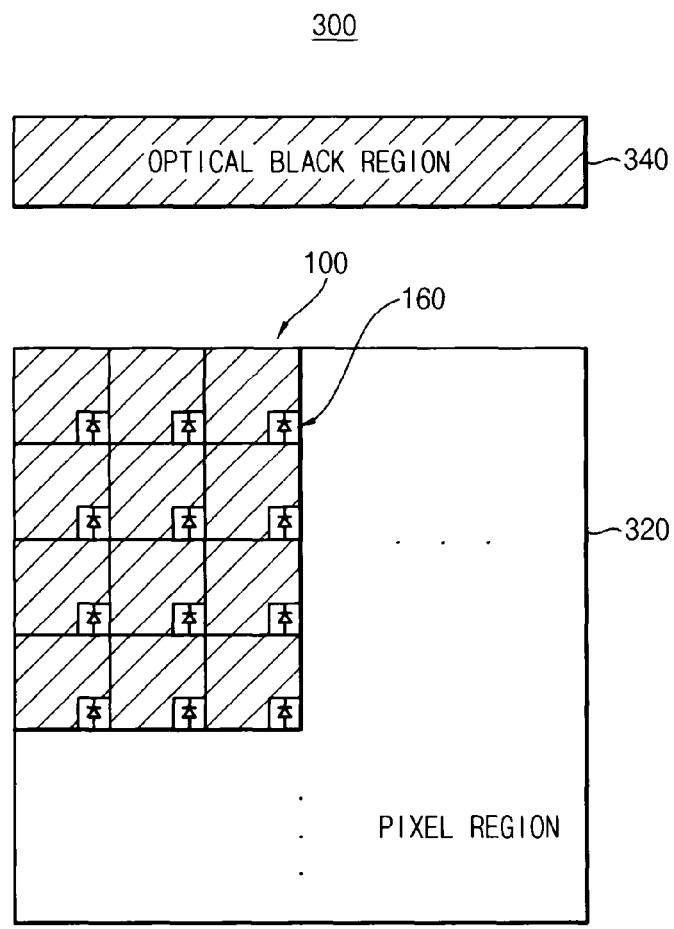
FIG. 8 is a diagram illustrating another example of a unit pixel array including a unit pixel of FIG. 1.

FIG. 8 is a diagram illustrating another example of a unit pixel array including a unit pixel of FIG. 1. Referring to FIG. 8, the unit pixel array 300 may include a pixel region 320 and an optical black region 340. The pixel region 320 may include a plurality of unit pixels 100, and the optical black region 340 may include a plurality of dummy pixels (not illustrated).

Each unit pixel 100 may include the accumulation circuit 120 that generates the accumulated dark current IAD by accumulating the dark current ID during the TOF, the output voltage generation circuit 140 that generates and outputs the output voltage VOUT corresponding to the TOF based on the accumulated dark current IAD, the control circuit 160 that controls an operation of the output voltage generation circuit 140 in response to the light signal LPS, the light signal LPS being emitted toward an object by the light source, and then input to each unit pixel 100 after being reflected by the object, and the initialization circuit 180 that initializes the accumulation circuit 160 on a predetermined cycle. Since each unit pixel 100 is described above, duplicated descriptions will be omitted below. As illustrated in FIG. 5, except for the control circuit 160 that receives the light signal LPS, the accumulation circuit 120, the output voltage generation circuit 160, and the initialization circuit 180 may be optically shaded from the light signal LPS in each unit pixel 100.

In some example embodiments, a shading layer or a bulk color filter layer may be formed over the accumulation circuit 120, the output voltage generation circuit 160, and the initialization circuit 180 in each unit pixel 100. In another example embodiment, a shading layer or a bulk color filter layer may be formed over only the accumulation circuit 120 in each unit pixel 100. The shading layer may be formed by a metal or a poly-silicon, and the bulk color filter layer may be formed by laminating a plurality of color filters having different colors.

However, materials of the shading layer and the bulk color filter layer are not limited thereto. Meanwhile, when the photodiode PD of each unit pixel 100 generates the dark current ID, a magnitude of the dark current ID may be determined according to a temperature. Thus, a temperature provided to a plurality of unit pixels 100 should be constant in order to accurately generate the output voltage VOUT corresponding to the TOF. Therefore, a heat reservoir may be attached to the unit pixel array 300. Consequently, all photodiodes PD in the unit pixels 100 may be maintained at a specific temperature (i.e., the same temperature).

A structure of each dummy pixel of the optical black region 340 may be substantially the same as a structure of each unit pixel 100 of the pixel region 320. However, since each dummy pixel is optically shaded from the light signal LPS, the dark current may also be generated based on certain factors (e.g., a temperature) without any light input from outside. Generally, the optical black region 340 is included for an auto dark level compensation (ADLC). However, in the unit pixel array 300, the optical black region 340 may be included in order to provide a reference value for the accumulated dark current IAD generated by each unit pixel 100. That is, an output voltage output from the optical black region 340 may be used as a reference value for an output voltage VOUT output from each unit pixel 100.

In some example embodiments, a shading layer or a bulk color filter layer may be formed over the optical black region 340. The shading layer may include a metal or polysilicon, and the bulk color filter layer may be formed by laminating a plurality of color filters having different colors. However, materials of the shading layer and the bulk color filter layer are not limited thereto. A reference voltage output from the optical black region 340 may be an output voltage of a specific dummy pixel included in the optical black region 340, or may be a mean value of output voltages output from the dummy pixels included in the optical black region 340. As described above, the unit pixel array 300 may include the pixel region 320 and the optical black region 340. Thus, the TOF may be accurately calculated by comparing an output voltage VOUT output from each unit pixel 100 with a reference voltage output from the optical black region 340.

Figure 9:
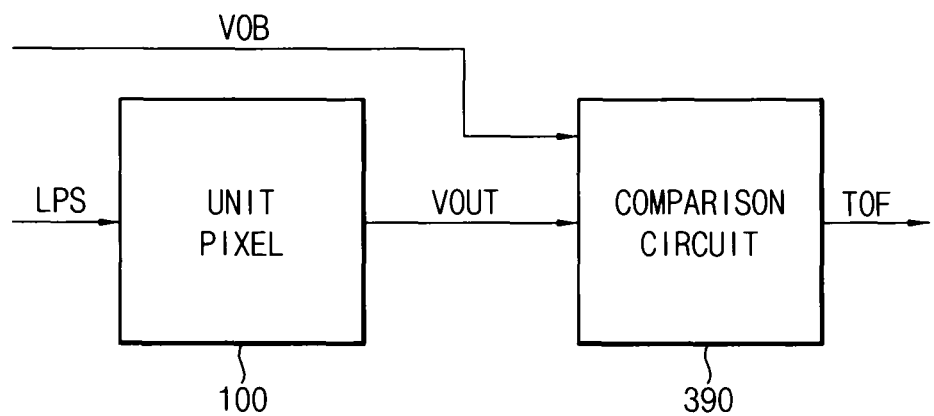
FIG. 9 is a block diagram illustrating an example in which a time of flight (TOF) is calculated in a unit pixel array of FIG. 8.

FIG. 9 is a block diagram illustrating an example in which a time of flight (TOF) is calculated in a unit pixel array of FIG. 8. Referring to FIG. 9, each unit pixel 100 may be coupled to a comparison circuit 390 in the unit pixel array 300. The comparison circuit 390 may output the time of flight TOF corresponding to the output voltage VOUT by comparing the output voltage VOUT output from each unit pixel 100 with the reference voltage VOB output from the optical black region 340. In detail, the initialization circuit 180 may initialize the accumulation circuit 120 when the light source (i.e., an optical pulse emission device) emits the light signal LPS (i.e., an optical pulse). In addition, the accumulation circuit 120 may generate the accumulated dark current IAD by accumulating the dark current ID until the light signal LPS is input to the unit pixel 100 after being reflected by an object. The control circuit 160 may control the output voltage generation circuit 140 to generate the output voltage VOUT corresponding to the time of flight TOF when the light signal LPS is input to each unit pixel 100. The comparison circuit 390 may output the time of flight TOF by comparing the output voltage VOUT with the reference voltage VOB. Hereinafter, with reference to FIG. 10, it will be described that the time of flight TOF is output by comparing the output voltage VOUT with the reference voltage VOB.

Figure 10:
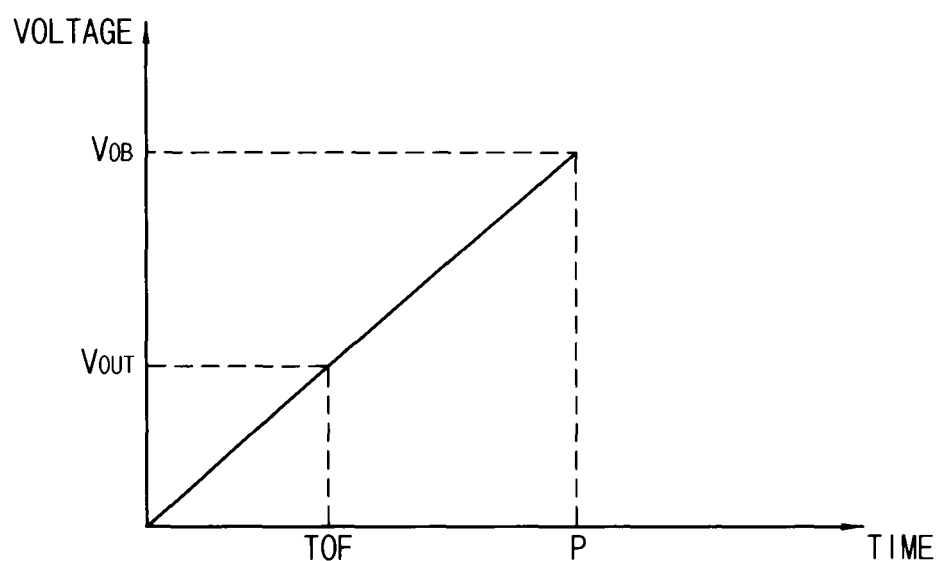
FIG. 10 is a graph illustrating an example in which a time of flight (TOF) is calculated in a unit pixel array of FIG. 8.

FIG. 10 is a graph illustrating an example in which a time of flight (TOF) is calculated in a unit pixel array of FIG. 8.

Referring to FIG. 10, the X-axis indicates a time, and the Y-axis indicates a voltage. In addition, 'P' indicates a predetermined cycle on which the light source (i.e., an optical pulse emission device) emits the light signal LPS (i.e., an optical pulse). "TOF" indicates a time of flight during which the light signal LPS is emitted toward an object by the light source, and then input to the unit pixel 100 after being reflected by the object. The predetermined cycle P may be determined by an operator (or, a user). Thus, an output voltage output from a specific dummy pixel of the optical black region 340 during a time corresponding to the predetermined cycle P, or a mean value of output voltages output from dummy pixels of the optical black region 340 during a time corresponding to the predetermined cycle P may be provided as the reference voltage VOB. Since the photodiode PD included in each unit pixel 100 is optically shaded from the light signal LPS, dark current characteristics of each unit pixel 100 included in the pixel region 320 may be substantially the same as dark current characteristics of each dummy pixel included in the optical black region 340. The reference voltage VOB output from each dummy pixel of the optical black region 340 may be determined based on the accumulated dark current that is generated by accumulating the dark current during a time corresponding to the predetermined cycle P. Thus, since a relation between the predetermined cycle P and the reference voltage VOB is provided for each dummy pixel of the optical black region 340, the time of flight TOF may be directly calculated (i.e., indicated as an arrow C) by the output voltage VOUT based on the relation between the predetermined cycle P and the reference voltage VOB when the output voltage VOUT output from each unit pixel 100 is obtained.

Figure 11:
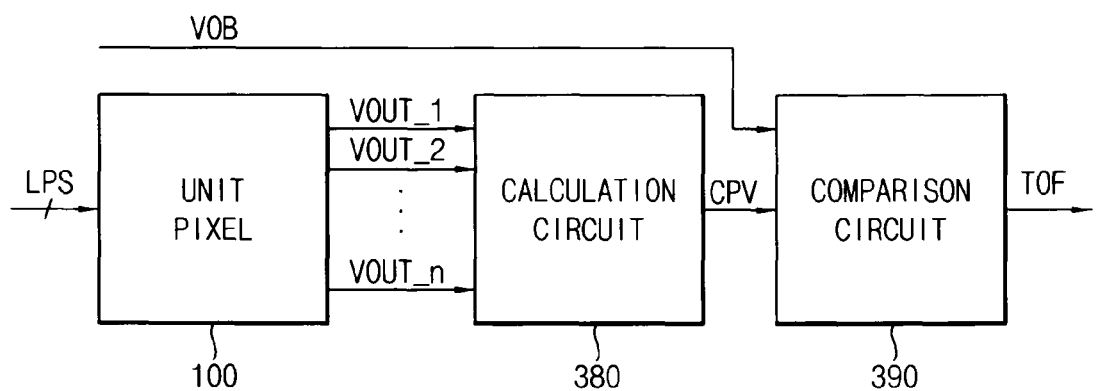
FIG. 11 is a block diagram illustrating another example in which a time of flight (TOF) is calculated in a unit pixel array of FIG. 8.

FIG. 11 is a block diagram illustrating another example in which a time of flight (TOF) is calculated in a unit pixel array of FIG. 8. Referring to FIG. 11, a calculation circuit 380 may be located between each unit pixel 100 and a comparison circuit 390 in order to improve an accuracy of the time of flight TOF. In addition, the calculation circuit 380 may output a final output voltage CPV by calculating a mean value of first through (n)th output voltages VOUT_1 through VOUT_n. The calculation circuit 380 may provide the final output voltage CPV to the comparison circuit 390 by calculating a mean value of the first through (n)th output voltages VOUT_1 through VOUT_n. In addition, the comparison circuit 390 may calculate the time of flight TOF corresponding to the final output voltage CPV by comparing the final output voltage CPV with the reference voltage VOB output from the optical black region 340.

In detail, since the light source (i.e., an optical pulse emission device) emits the light signal LPS (i.e., an optical pulse) on a predetermined cycle, 3D image sensing operations may be performed n times during n cycles. Namely, each unit pixel 100 may sequentially output the first through (n)th output voltages VOUT_1 through VOUT_n during n cycles. Thus, the calculation circuit 380 may temporarily store the first through (n)th output voltages VOUT_1 through VOUT_n output from each unit pixel 100, and may calculate a mean value of the first through (n)th output voltages VOUT_1 through VOUT_n to output the mean value as the final output voltage CPV. The comparison circuit 390 may generate the time of flight TOF by comparing the final output voltage CPV with the reference voltage VOB.

Generally, dark current characteristics of a photodiode PD included in each unit pixel 100 may vary based on certain factors. In addition, a reliability of a mean value for a plurality of values generated by a plurality of 3D image sensing operations may be higher than a reliability of one value generated by one 3D image sensing operation. Thus, if the time of flight TOF is calculated based on the final output voltage CPV, an accuracy of the time of flight TOF may be improved. The number of 3D image sensing operations may be determined according to required conditions. However, as the number of 3D image sensing operations is increased, an operation time may be increased (i.e., although an accuracy of the time of flight TOF is increased). As the number of 3D image sensing operations is decreased, an accuracy of the time of flight TOF may be decreased (i.e., although an operation time is decreased). Therefore, the number of 3D image sensing operations may be determined by considering the above trade-off.

Figure 12:
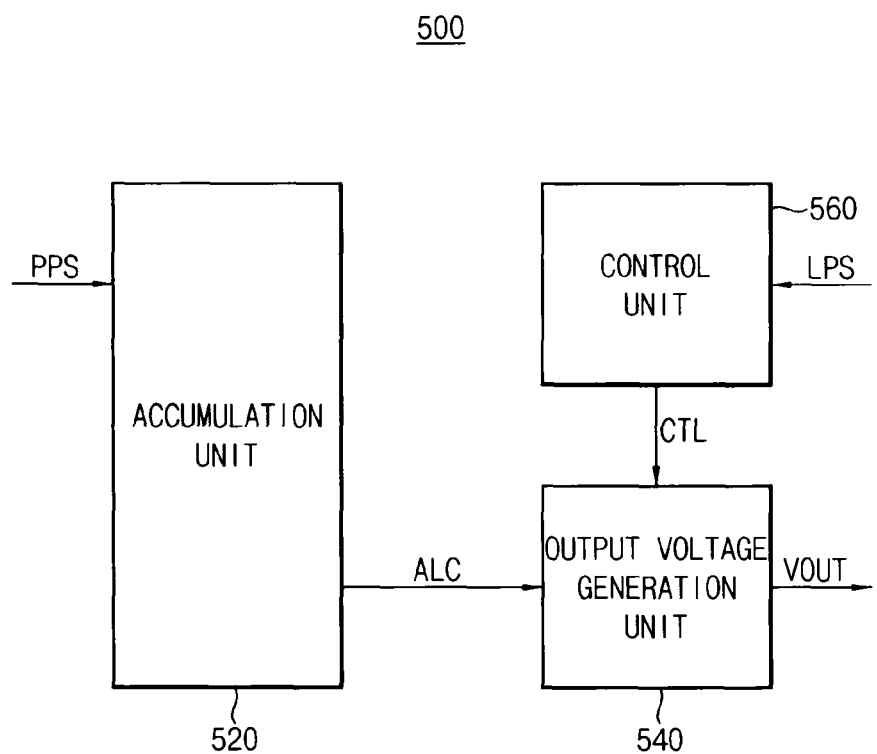
FIG. 12 is a block diagram illustrating a unit pixel of a three-dimensional (3D) image sensor according to some example embodiments.

FIG. 12 is a block diagram illustrating a unit pixel of a three-dimensional (3D) image sensor according to further example embodiments. Referring to FIG. 12, the unit pixel 500 of the 3D image sensor may include an accumulation circuit 520, an output voltage generation circuit 540, and a control circuit 560.

The accumulation circuit 520 may generate a leakage current, and may generate the accumulated leakage current ALC by accumulating the leakage current during a time of flight (TOF). The TOF may be an elapsed time during which a light signal LPS is emitted toward an object by a light source, and then input to the unit pixel 500 after being reflected by the object. The accumulation circuit 520 may provide the accumulated leakage current ALC to the output voltage generation circuit 540 when the light signal LPS is input to the unit pixel 500. According to some example embodiments, the light source may be an optical pulse emission device, and the light signal LPS may be an optical pulse. For example, the light source may correspond to a laser diode, and the light signal LPS may correspond to a laser pulse.

In some example embodiments, the accumulation circuit 520 may include a photodiode and a first transistor that generates the leakage current. The photodiode of the accumulation circuit 520 may be optically shaded from the light signal LPS. For example, a shading layer or a bulk color filter layer may be formed over the accumulation circuit 520. Generally, the leakage current generated by the first transistor may be determined according to a threshold voltage of the first transistor. Hence, each unit pixel 500 included in a unit pixel array may include the first transistor having the same threshold voltage. As a result, a reliability of 3D image sensing operations may be improved.

Further, the accumulation circuit 520 may be initialized on a predetermined cycle. Thus, the accumulation circuit 520 may newly generate the accumulated leakage current ALC on the predetermined cycle. For this operation, the accumulation circuit 520 may receive an initialization control signal PPS on the predetermined cycle. The first transistor may turn on in response to the initialization control signal PPS, such that the accumulation circuit 520 may be initialized on the predetermined cycle. Thus, the initialization control signal PPS may be triggered on the predetermined cycle. In other words, the initialization control signal PPS may be maintained in a deactivated state, and then may be activated on the predetermined cycle to turn-on the first transistor.

The output voltage generation circuit 540 may generate and output an output voltage VOUT corresponding to the TOF based on the accumulated leakage current ALC input from the accumulation circuit 520. Here, since the accumulated leakage current ALC is proportional to a time in which the leakage current is accumulated, and the output voltage VOUT is proportional to the accumulated leakage current ALC, the TOF may be substantially proportional to the accumulated leakage current ALC. Thus, the TOF may be calculated based on the output voltage VOUT output from the output voltage generation circuit 540. For example, the TOF may be calculated using a mapping table that includes information related to a relation between the output voltage VOUT and the TOF.

In some example embodiments, the output voltage generation circuit 540 may include a second transistor that transfers charge corresponding to the accumulated leakage current ALC based on a control signal CTL input from the control circuit 560, and a third transistor that generates the output voltage VOUT based on the transferred charge. When the TOF is calculated based on the output voltage VOUT, a distance D between the unit pixel 500 and the object may be calculated as D=(c×TOF)/2, where c denotes the velocity of light, 3*10^8 m/s. However, a method of calculating the distance D between the unit pixel 500 and the object is not limited thereto.

The control circuit 560 may control an operation of the output voltage generation circuit 540 in response to the light signal LPS that is input to the unit pixel 500 after being reflected by the object. The control circuit 560 may control an operation of the output voltage generation circuit 540 by outputting the control signal CTL to the output voltage generation circuit 540. For example, when the control signal CTL is activated (i.e., in an activated state), the output voltage generation circuit 540 may generate the output voltage VOUT. When the control signal CTL is deactivated (i.e., in a deactivated state), the output voltage generation circuit 540 may not generate the output voltage VOUT. The control signal CTL may be triggered when the light signal LPS is input to the unit pixel 500. In other words, the control signal CTL may be maintained in a deactivated state, and then may be activated when the light signal LPS is input to the unit pixel 500.

In some example embodiments, the control circuit 560 may include a light sensing device that activates the control signal CTL when the light signal LPS is input to the unit pixel 500. The light sensing device may be Geiger-mode avalanche photodiode (GAPD), or linear-mode avalanche photodiode (LAPD). However, the light sensing device is not limited thereto.

As described above, the unit pixel 500 may measure the TOF based on the leakage current that is generated by the first transistor of the accumulation circuit 520. The unit pixel 500 may have a structure that is similar to a structure of a unit pixel included in a typical image sensor. However, in the structure of the unit pixel 500, a photodiode (i.e., a photoelectric device) is optically shaded, and a light sensing device is coupled to a gate terminal of a transfer transistor. Thus, compared to a conventional 3D image sensor, a 3D image sensor having the unit pixel 500 may not need a light sensing device having a relatively high sensitivity, and a time to digital converter for measuring the TOF for each unit pixel. As a result, the 3D image sensor having the unit pixel 500 may have a simplified structure, and thus may be manufactured in a small size. In addition, the 3D image sensor having the unit pixel 500 may reduce manufacturing cost and power consumption.

Figure 13:
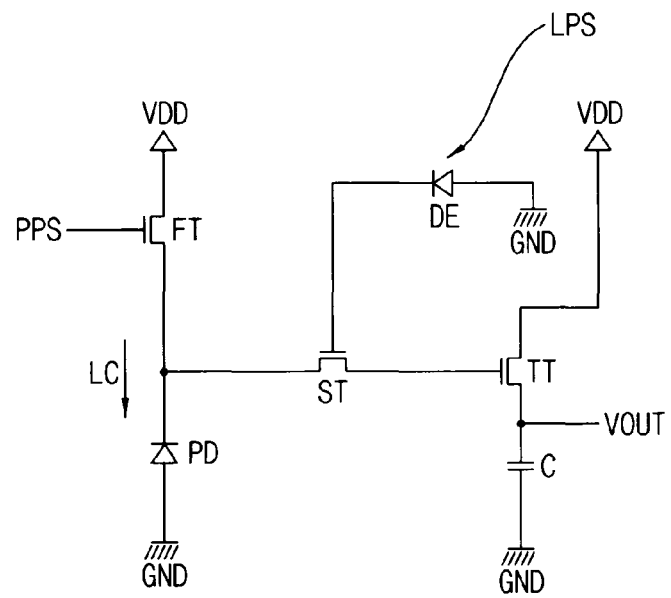
FIG. 13 is a circuit diagram illustrating an example of a unit pixel of FIG. 12.

FIG. 13 is a circuit diagram illustrating an example of a unit pixel of FIG. 12. Referring to FIG. 13, the unit pixel 500 may include a photodiode PD, a first transistor FT, a second transistor ST, a third transistor TT, a capacitor C, and a light sensing device DE. However, a structure of the unit pixel 500 is not limited thereto.

A structure having the photodiode PD and the first transistor may correspond to the accumulation circuit 520 of the unit pixel 500. A first terminal of the photodiode PD may be coupled to a first terminal of the first transistor FT. A second terminal of the photodiode PD may be coupled to a ground voltage GND. A first terminal of the first transistor FT may be coupled to the first terminal of the photodiode PD. A second terminal of the first transistor FT may be coupled to a power supply node VDD. In addition, a gate terminal of the first transistor FT may receive the initialization control signal PPS. The unit pixel 500 may generate the output voltage VOUT corresponding to the TOF based on the leakage current LC generated by the first transistor FT but the dark current generated by the photodiode PD. In some example embodiments, when the light source (i.e., an optical pulse emission device) emits the light signal LPS (i.e., an optical pulse), the initialization control signal PPS may be triggered in response thereto. As described above, when the initialization control signal PPS is activated, the first transistor FT may turn on. Thus, the first transistor FT may be initialized when the initialization control signal PPS is activated. When the initialization control signal PPS is in a deactivated state, the first transistor FT may turn off. Thus, the accumulated leakage current ALC may be generated by the first transistor FT.

A structure having the second transistor ST, the third transistor TT, and the capacitor C may correspond to the output voltage generation circuit 540 of the unit pixel 500. A first terminal of the second transistor ST may be coupled to the first terminal of the photodiode PD. A second terminal of the second transistor ST may be coupled to a gate terminal of the third transistor TT. In addition, a gate terminal of the second transistor ST may be coupled to a first terminal of the light sensing device DE. In example embodiments, the second terminal of the second transistor ST may act as a floating diffusion node by being coupled to an additional capacitor (not illustrated). A first terminal of the third transistor TT may be coupled to a first terminal of the capacitor C. A second terminal of the third transistor TT may be coupled to the power supply node VDD. In addition, a gate terminal of the third transistor TT may be coupled to the second terminal of the second transistor ST. The first terminal of the third transistor TT may correspond to an output terminal at which the output voltage VOUT is output. A first terminal of the capacitor C may be coupled to the first terminal of the third transistor TT. A second terminal of the capacitor C may be coupled to the ground voltage GND. The second transistor ST may turn on when the light signal LPS is input to the light sensing device DE. Thus, the second transistor ST may transfer charge indicative of the accumulated leakage current ALC of the first terminal of the photodiode PD to the gate terminal of the third transistor TT. The third transistor TT may turn on based on the transferred charge and may generate the output voltage VOUT using the capacitor C.

The light sensing device DE may correspond to the control circuit 560 of the unit pixel 500. A first terminal of the light sensing device DE may be coupled to the gate terminal of the second transistor ST. A second terminal of the light sensing device DE may be coupled to the ground voltage GND. The light sensing device DE may control the second transistor ST to be maintained in a turn-off state, and then may control the second transistor ST to turn-on when the light signal LPS is input to the light sensing device DE. For this operation, the light sensing device DE may correspond to Geiger-mode avalanche photodiode (GAPD), or linear-mode avalanche photodiode (LAPD). However, the light sensing device DE is not limited thereto. As described above, since the unit pixel 500 has a structure illustrated in FIG. 13, the unit pixel 500 may generate the output voltage VOUT corresponding to the TOF based on the leakage current LC generated by the first transistor FT. Meanwhile, although not illustrated in FIG. 13, the accumulation circuit 520 may be optically shaded from the light signal LPS.

Figure 14:
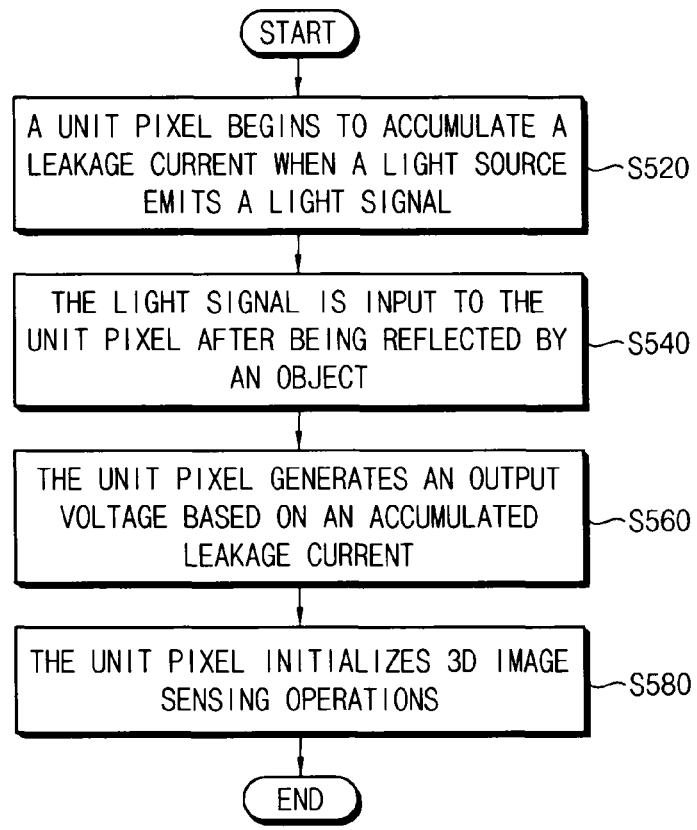
FIG. 14 is a flow chart illustrating an operation of a unit pixel of FIG. 13.

FIG. 14 is a flow chart illustrating an operation of a unit pixel of FIG. 13. Referring to FIG. 14, the unit pixel 500 may begin to accumulate the leakage current LC when the light source (i.e., an optical pulse emission device) emits the light signal LPS (i.e., an optical pulse) (Step S520). In example embodiments, the light source may correspond to a laser diode, and the light signal LPS may correspond to a laser pulse. The unit pixel 500 may generate the accumulated leakage current ALC by accumulating the leakage current LC generated by the first transistor FT until the light signal LPS is input to the unit pixel 500 after being reflected by the object. When the light signal LPS is input to the unit pixel 500 (Step S540), the unit pixel 500 may generate the output voltage VOUT corresponding to the TOF based on the accumulated leakage current ALC (Step S560). Next, the unit pixel 500 may initialize 3D image sensing operations (Step S580), and then may repeat the steps (i.e., Step S520, Step S540, Step S560) or may finish the 3D image sensing operations.

Figure 15:
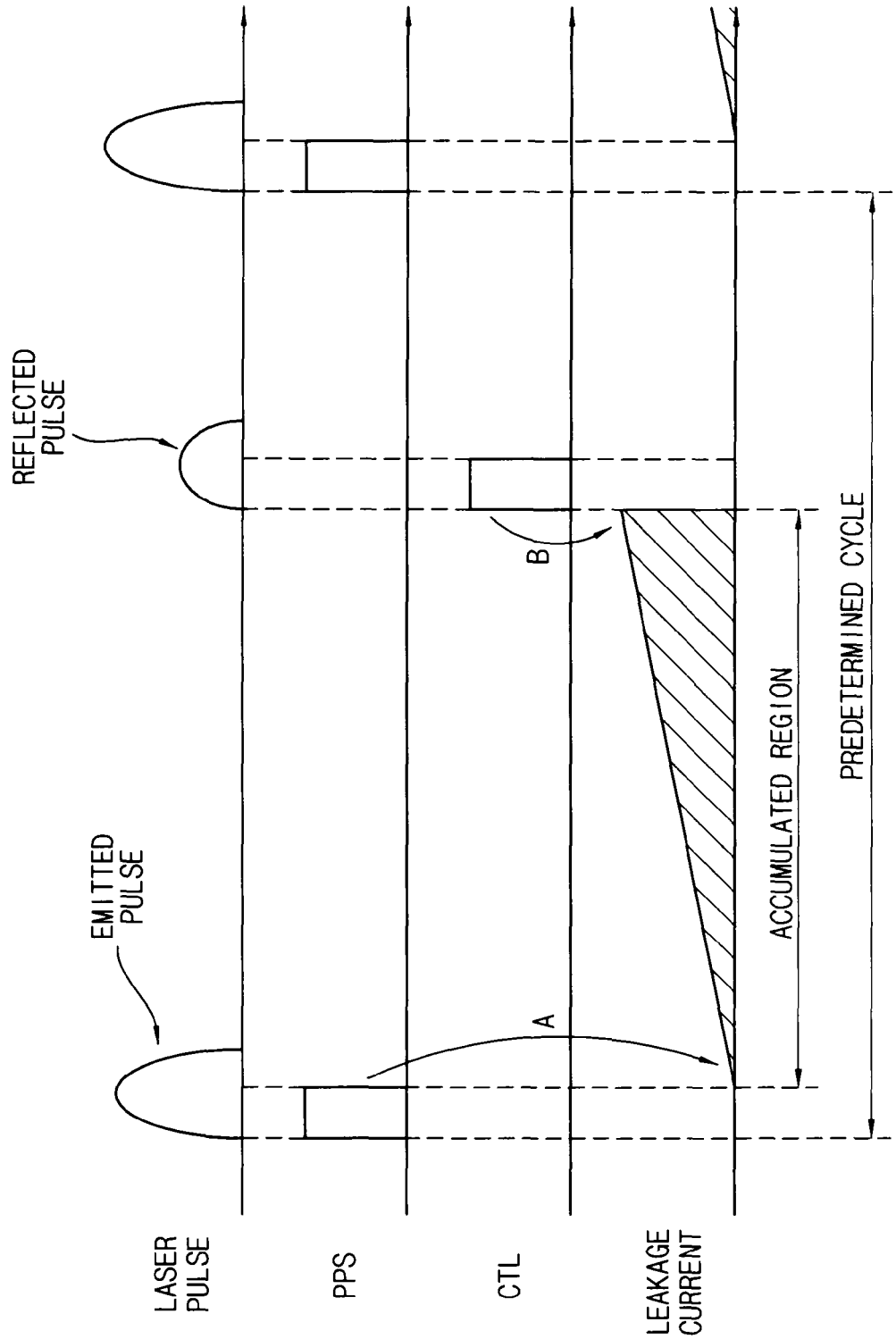
FIG. 15 is a timing diagram illustrating an operation of a unit pixel of FIG. 13.

FIG. 15 is a timing diagram illustrating an operation of a unit pixel of FIG. 13. Referring to FIG. 15, the light signal LPS (i.e., an optical pulse) emitted by the light source (i.e., an optical pulse emission device) may have a predetermined cycle. As illustrated in FIG. 15, the light source may correspond to a laser diode, and the light signal LPS may correspond to a laser pulse. In detail, when the light signal LPS is emitted toward an object by the light source, the light signal LPS may be input to the unit pixel 500 after being reflected by the object. As illustrated in FIG. 15, when the light signal LPS is emitted by the light source, the initialization control signal PPS may be triggered. The initialization control signal PPS may be maintained in a deactivated state, and then may be activated when the light signal LPS is emitted by the light source. The first transistor FT may be initialized (i.e., indicated as an arrow A) when the initialization control signal PPS is activated. The first transistor FT may generate the accumulated leakage current ALC by accumulating the leakage current LC. Next, when the laser pulse is input to the unit pixel 500 after being reflected by the object, the light sensing device DE may activate the control signal CTL. The first transistor FT may stop generating the accumulated leakage current ALC (i.e., indicated as an arrow B).

After the first transistor FT stops generating the accumulated leakage current ALC, the unit pixel 500 may generate the output voltage VOUT corresponding to the TOF based on the accumulated leakage current ALC. As described above, since the accumulated leakage current ALC is proportional to a time during which the leakage current LC is accumulated, and the output voltage VOUT is proportional to the accumulated leakage current ALC, the TOF may be substantially proportional to the accumulated leakage current ALC. Thus, the TOF may be accurately calculated based on the output voltage VOUT output from the unit pixel 500. Next, when the light source emits the light signal LPS again according to the predetermined cycle, the unit pixel 500 may repeat the above process.

Figure 16:
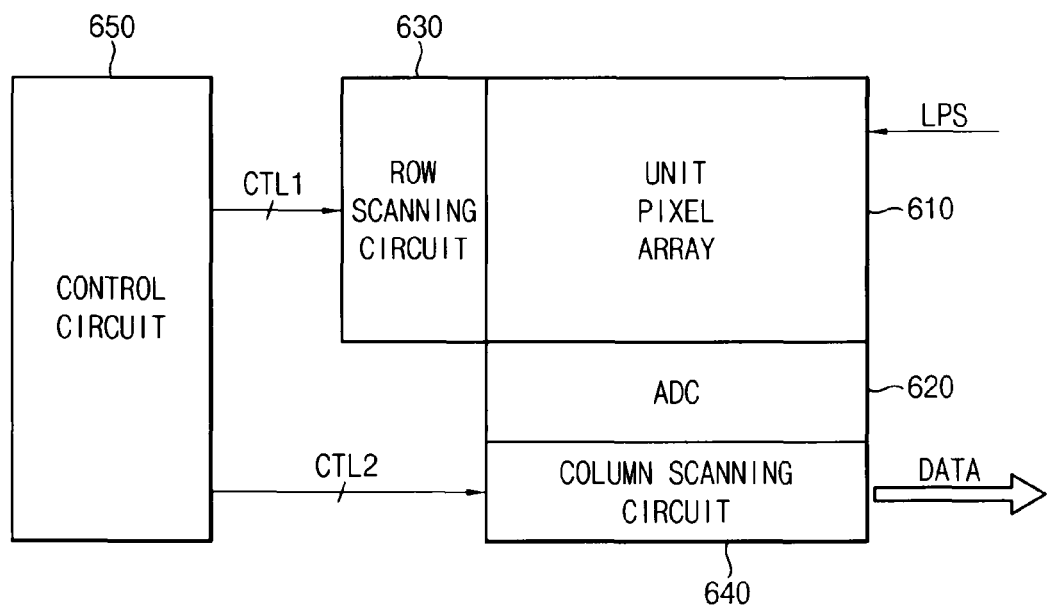
FIG. 16 is a block diagram illustrating a three-dimensional (3D) image sensor including a unit pixel according to some example embodiments.
Figure 17:
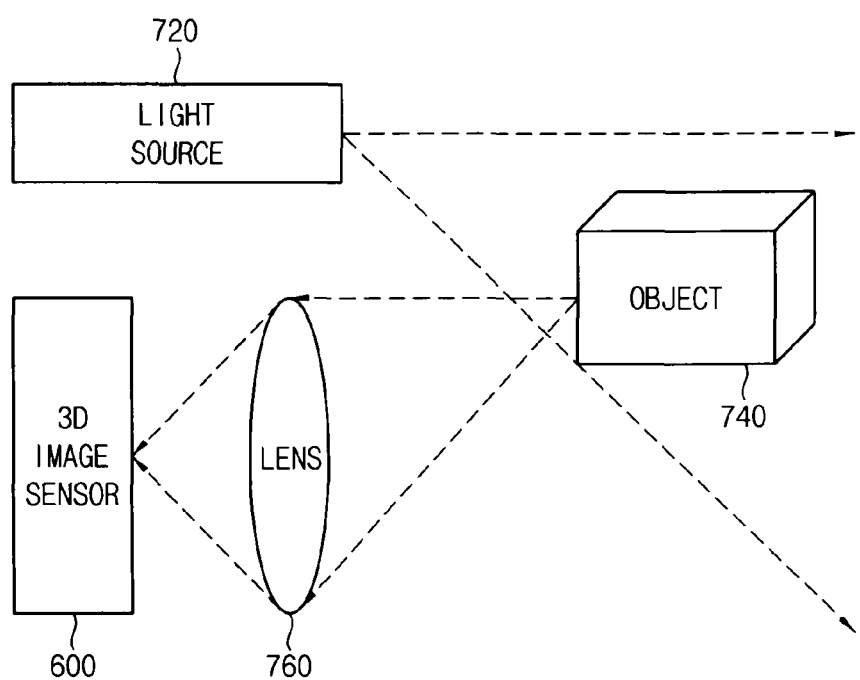
FIG. 17 is a diagram illustrating a three-dimensional (3D) image sensing system including a 3D image sensor of FIG. 16.

FIG. 16 is a block diagram illustrating a three-dimensional (3D) image sensor including a unit pixel according to some example embodiments. FIG. 17 is a diagram illustrating a three-dimensional (3D) image sensing system including a 3D image sensor of FIG. 16.

Referring to FIGS. 16 and 17, when a light signal LPS emitted by a light source 720 is input to the 3D image sensor 600 via a lens 760 after being reflected by an object 740, the 3D image sensor 600 may perform a 3D image sensing operation based on the light signal LPS. According to some example embodiments, the light source 720 may be an optical pulse emission device, and the light signal LPS may be an optical pulse. For example, the light source 720 may correspond to a laser diode, and the light signal LPS may correspond to a laser pulse. When each unit pixel output the TOF based on a dark current or a leakage current, the 3D image sensor 600 may implement a stereoscopic image by measuring a distance between each unit pixel and the object 740 based on the TOF. For this operation, the 3D image sensor 600 may include a unit pixel array 610, an analog to digital converting (ADC) circuit 620, a row scanning circuit 630, a column scanning circuit 640, and a control circuit 650. According to some example embodiments, the light source 720 may be located in the 3D image sensor 600.

The unit pixel array 610 may include a plurality of unit pixels. Each unit pixel may measure the TOF based on the dark current or the leakage current. In some example embodiments, each unit pixel may include an accumulation circuit that generates an accumulated dark current by accumulating the dark current during the TOF, an output voltage generation circuit that generates and outputs an output voltage corresponding to the TOF based on the accumulated dark current, a control circuit that controls an operation of the output voltage generation circuit based on the light signal LPS, and an initialization circuit that initialize the accumulation circuit on a predetermined cycle. The accumulation circuit may be optically shaded to generate the dark current. In another example embodiment, each unit pixel may include an accumulation circuit that generates an accumulated leakage current by accumulating the leakage current during the TOF, an output voltage generation circuit that generates and outputs an output voltage corresponding to the TOF based on the accumulated leakage current, and a control circuit that controls an operation of the output voltage generation circuit based on the light signal LPS. The accumulation circuit may be initialized on a predetermined cycle. Since each unit pixel is described above, duplicated descriptions will be omitted below. Therefore, each unit pixel of the unit pixel array 610 may measure the TOF based on the dark current or the leakage current generated by the accumulation circuit. The TOF may be interpreted as information related to a distance between each unit pixel and the object 740.

The analog to digital converting circuit 620 may convert an analog signal (e.g., an output voltage) output from the unit pixel array 610 into a digital signal DATA. According to some example embodiments, the analog to digital converting circuit 620 may perform column analog to digital converting operations using a plurality of analog to digital converters, or may perform single analog to digital converting operations using an analog to digital converter. The row scanning circuit 630 may receive control signals CTL1 from the control circuit 650, and may control row scanning operations for the unit pixel array 610. The column scanning circuit 640 may receive control signals CTL2 from the control circuit 650, and may control column scanning operations for the unit pixel array 610. The column scanning circuit 640 may output the digital signal DATA converted by the analog to digital converting circuit 620 to a digital signal processing (DSP) circuit or an external host. The control circuit 650 may control the analog to digital converting circuit 620, the row scanning circuit 630, and the column scanning circuit 640.

As described above, since the accumulated dark current or the accumulated leakage current is proportional to a time during which the dark current or the leakage current is accumulated, and the output voltage VOUT is proportional to the accumulated dark current or the accumulated leakage current, the TOF may be substantially proportional to the accumulated dark current or the accumulated leakage current. In addition, since the digital signal DATA may be a value generated by converting the output voltage of each unit pixel, the 3D image sensor 600 may calculate a distance between the 3D image sensor 600 and the object 740 based on the digital signal DATA. According to some example embodiments, the 3D image sensor 600 may calculate a horizontal position, a vertical position, an area, etc of the object 740 to further control an emission angle, an emission position, etc of the light source 720 based on the calculation result. As described above, each unit pixel of the unit pixel array 610 may measure the TOF based on the dark current or the leak current generated by the accumulation circuit, the accumulation circuit being optically shaded from the light signal LPS. Thus, each unit pixel of the unit pixel array 610 may have a structure that is similar to a structure of a unit pixel included in a typical image sensor. However, in the structure of each unit pixel of the unit pixel array 610, a photodiode (i.e., a photoelectric device) is optically shaded, and a light sensing device is coupled to a gate terminal of a transfer transistor. Thus, compared to a conventional 3D image sensor, the 3D image sensor 600 may not need a light sensing device having a relatively high sensitivity, and a time to digital converter for measuring the TOF for each unit pixel of the unit pixel array 610. As a result, the 3D image sensor 600 may have a simplified structure, and thus may be manufactured in a small size. In addition, the 3D image sensor 600 may reduce manufacturing cost and power consumption.

Figure 18:
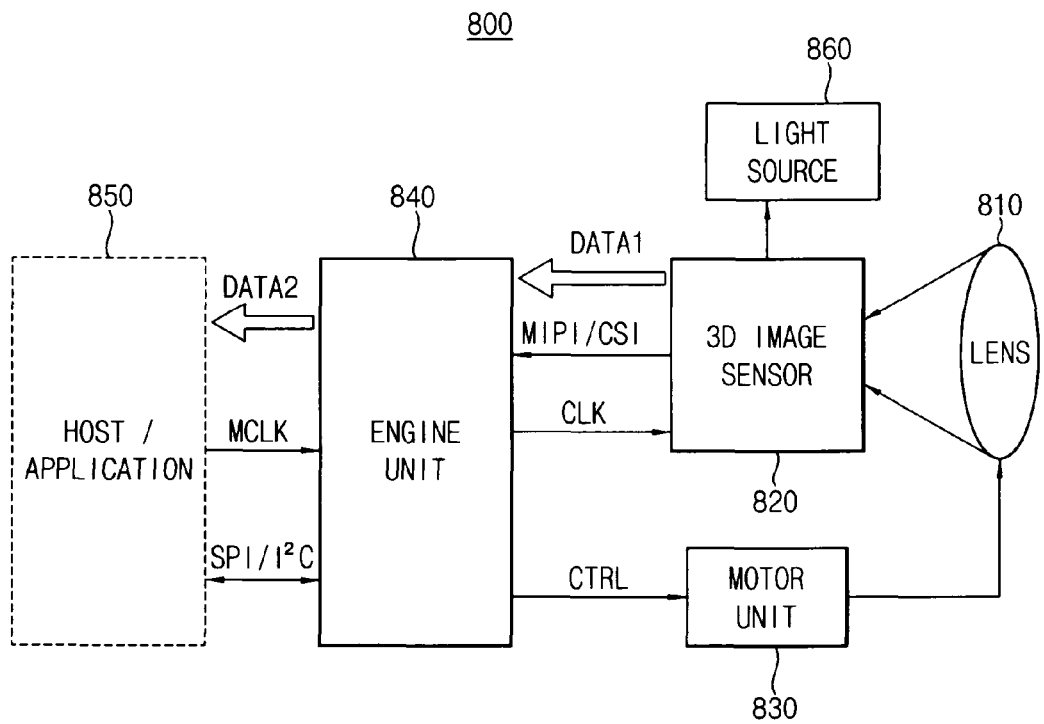
FIG. 18 is a block diagram illustrating an example of a camera including a three-dimensional (3D) image sensor of FIG. 16.

FIG. 18 is a block diagram illustrating an example of a camera including a three-dimensional (3D) image sensor of FIG. 16. Referring to FIG. 18, the camera 800 may include a lens 810, a 3D image sensor 820, a motor circuit 830, and an engine circuit 840. The 3D image sensor 820 may correspond to the 3D image sensor 600 of FIG. 16.

The lens 810 may concentrate light signals to light-receiving regions (e.g., a plurality of unit pixels included in a unit pixel array) of the 3D image sensor 820. The 3D image sensor 820 may generate data DATA1 including information related to a distance between each unit pixel and an object based on the light signals input via the lens 810. The 3D image sensor 820 may provide the data DATA1 to the engine circuit 840 based on a clock signal CLK. According to some example embodiments, the 3D image sensor 820 may interface with the engine circuit 840 using Mobile Industry Processor Interface (MIPI) and/or Camera Serial Interface (CSI). The motor circuit 830 may control a focus of the lens 810, or may perform shuttering operations based on a control signal CTRL provided from the engine circuit 840. According to some example embodiments, a relative position of the light source 860 and the lens 810 may be controlled by the motor circuit 830 or the 3D image sensor 820. The engine circuit 840 may control the 3D image sensor 820 and the motor circuit 830. In addition, the engine circuit 840 may process the data DATA1 input from the 3D image sensor 820. For instance, the engine circuit 840 may generate stereoscopic data based on the data DATA1 input from the 3D image sensor 820. The engine circuit 840 may be coupled to a host/application 850, and may provide data DATA2 to the host/application 850 based on a master clock MCLK. According to some example embodiments, the engine circuit 840 may interface with the host/application 850 using Serial Peripheral Interface (SPI) and/or Inter Integrated Circuit (I2C).

Figure 19:
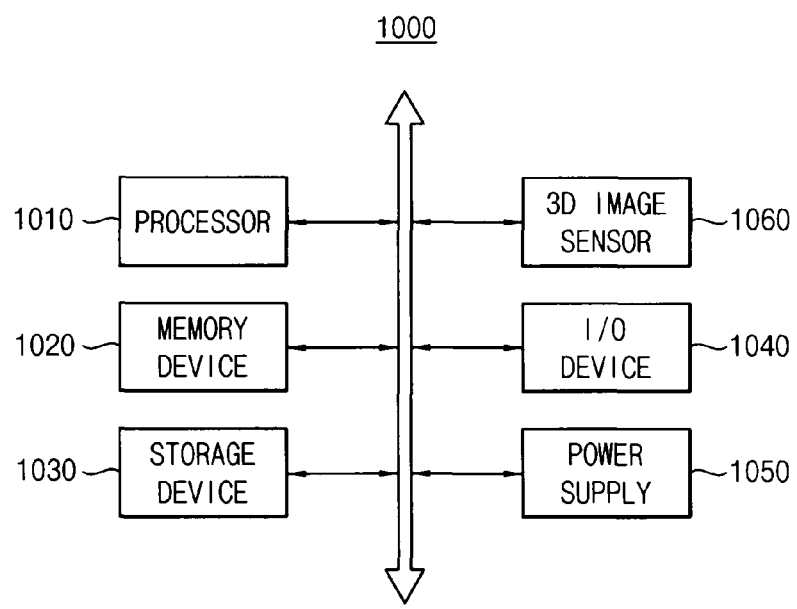
FIG. 19 is a block diagram illustrating an example of an electric device including a three-dimensional (3D) image sensor of FIG. 16.

FIG. 19 is a block diagram illustrating an example of an electric device including a three-dimensional (3D) image sensor of FIG. 16. Referring to FIG. 19, the electric device 1000 may include a processor 1010, a memory device 1020, a storage device 1030, an input/output (I/O) device 1040, a power supply 1050, and a 3D image sensor 1060. The 3D image sensor 1060 may correspond to the 3D image sensor 600 of FIG. 16. As not illustrated in FIG. 19, the electric device 1000 may further include a plurality of ports for communicating a video card, a sound card, a memory card, a universal serial bus (USB) device, other electric devices, etc.

The processor 1010 may perform various computing functions. The processor 1010 may be a micro-processor, a central processing circuit (CPU), etc. The processor 1010 may be coupled to the memory device 1020, the storage device 1030, and the I/O device 1040 via an address bus, a control bus, a data bus, etc. According to some example embodiments, the processor 1010 may be coupled to an extended bus such as a peripheral component interconnection (PCI) bus. The memory device 1020 may store data for operations of the electric device 1000. For example, the memory device 1020 may include a volatile semiconductor memory device such as a dynamic random access memory (DRAM) device, a static random access memory (SRAM) device, a mobile DRAM, etc, and a non-volatile semiconductor memory device such as an erasable programmable read-only memory (EPROM) device, an electrically erasable programmable read-only memory (EEPROM) device, a flash memory device, etc. The storage device 1030 may be a solid state drive device, a hard disk drive device, a CD-ROM device, etc. The I/O device 1040 may include an input device such as a keyboard, a keypad, a mouse, etc, and an output device such as a printer, a display device, etc. The power supply 1050 may provide a power for operations of the electric device 1000.

The 3D image sensor 1060 may communicate with the processor 1010 via buses or other communication links. As described above, the 3D image sensor 1060 may include a plurality of unit pixels in a unit pixel array. Here, each unit pixel may measure a time of flight (TOF) based on a dark current and/or a leakage current. In some example embodiments, each unit pixel may include an accumulation circuit that generates an accumulated dark current by accumulating the dark current during the TOF, an output voltage generation circuit that generates and outputs an output voltage corresponding to the TOF based on the accumulated dark current, a control circuit that controls an operation of the output voltage generation circuit based on the light signal LPS, and an initialization circuit that initialize the accumulation circuit on a predetermined cycle. The accumulation circuit may be optically shaded to generate the dark current. In another example embodiment, each unit pixel may include an accumulation circuit that generates an accumulated leakage current by accumulating the leakage current during the TOF, an output voltage generation circuit that generates and outputs an output voltage corresponding to the TOF based on the accumulated leakage current, and a control circuit that controls an operation of the output voltage generation circuit based on the light signal LPS. The accumulation circuit may be initialized on a predetermined cycle. According to some example embodiments, the 3D image sensor 1060 may be integrated with the processor 1010 in one chip.

The 3D image sensor 1060 may be implemented by various packages such as Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flat-Pack (TQFP), Small Outline Integrated Circuit (SOIC), Shrink Small Outline Package (SSOP), Thin Small Outline Package (TSOP), Thin Quad Flat-Pack (TQFP), System In Package (SIP), Multi Chip Package (MCP), Wafer-level Fabricated Package (WFP), Wafer-Level Processed Stack Package (WSP).

Figure 20:
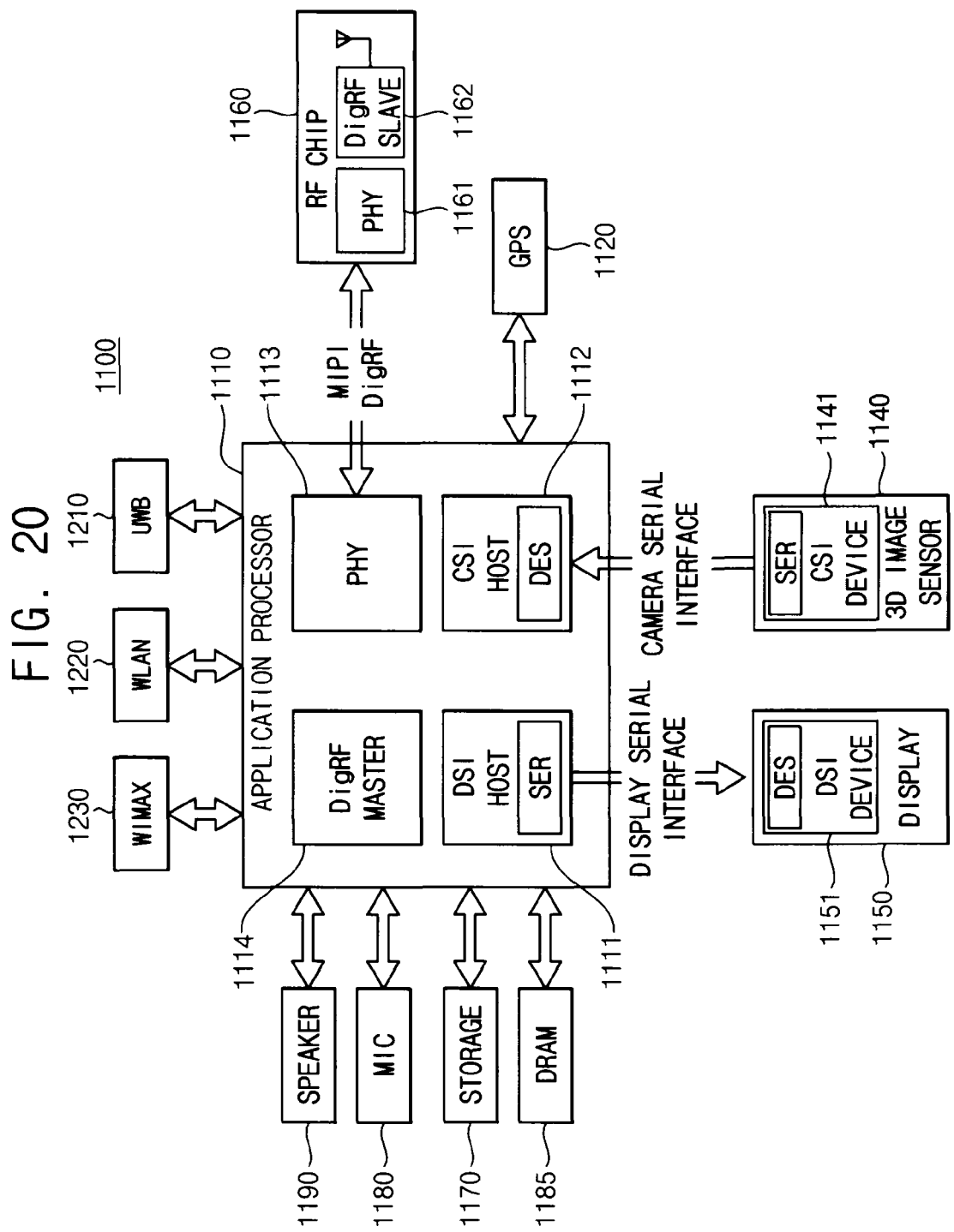
FIG. 20 is a block diagram illustrating an example of an interface used for an electric device of FIG. 19.

FIG. 20 is a block diagram illustrating an example of an interface used for an electric device of FIG. 19. Referring to FIG. 20, the electric device 1100 may be implemented by a data processing device that uses, or supports a mobile industry processor interface (MIPI) interface (e.g., a mobile phone, a personal digital assistant (PDA), a portable multimedia player (PMP), a smart phone, etc). The electric device 1100 may include an application processor 1110, a 3D image sensor 1140, a display device 1150, etc. A CSI host 1112 of the application processor 1110 may perform a serial communication with a CSI device 1141 of the 3D image sensor 1140 using a camera serial interface (CSI). In some example embodiments, the CSI host 1112 may include a light deserializer (DES), and the CSI device 1141 may include a light serializer (SER). A DSI host 1111 of the application processor 1110 may perform a serial communication with a DSI device 1151 of the display device 1150 using a display serial interface (DSI). In some example embodiments, the DSI host 1111 may include a light serializer (SER), and the DSI device 1151 may include a light deserializer (DES).

Further, the electric device 1100 may further include a radio frequency (RF) chip 1160. The RF chip 1160 may perform a communication with the application processor 1110. A physical layer (PHY) 1113 of the electric device 1100 and a physical layer (PHY) 1161 of the RF chip 1160 may perform data communications based on a MIPI DigRF. The application processor 1110 may further include a DigRF MASTER 1114 that controls the data communications of the PHY 1161. The electric device 1100 may include a global positioning system (GPS) 1120, a storage 1170, a MIC 1180, a DRAM device 1185, and a speaker 1190. In addition, the electric device 1100 may perform communications using an ultra wideband (UWB) 1210, a wireless local area network (WLAN) 1220, a worldwide interoperability for microwave access (WIMAX) 1230, etc. However, the structure and the interface of the electric device 1100 are not limited thereto.

The present inventive concept may be applied to a 3D image sensor and an electric device having the 3D image sensor. For example, the present inventive concept may be applied to an electric device such as a computer, a laptop, a digital camera, a 3D camera, a video camcorder, a cellular phone, a smart phone, a personal digital assistant (PDA), a portable multimedia player (PMP), a navigation system, a monitoring system, an auto focusing system, a video phone, a digital television, etc. The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:
1. A unit pixel for an image sensor comprising:
  an accumulation circuit configured to generate an accumulated dark current by accumulating a charge corresponding to a dark current during a time of flight (TOF), the accumulation circuit being optically shaded to generate the dark current;

an output voltage generation circuit configured to generate and output an output voltage corresponding to the TOF based on a charge corresponding to the accumulated dark current;

a control circuit configured to control an operation of the output voltage generation circuit based on a light signal that is input to the unit pixel after being reflected by an object, the light signal being emitted by a light source; and an initialization circuit configured to initialize the accumulation circuit at a predetermined cycle.

2. The unit pixel of claim 1, wherein the light source corresponds to an optical pulse emission device, and the light signal corresponds to an optical pulse.

3. The unit pixel of claim 2, wherein the accumulation circuit includes:

a photodiode configured to generate the dark current when being optically shaded.

4. The unit pixel of claim 3, wherein the photodiode is maintained at a desired temperature by a heat reservoir that is attached to a unit pixel array.

5. The unit pixel of claim 3, wherein the initialization circuit includes:

a first transistor configured to turn-on at the predetermined cycle to initialize the accumulation circuit.

6. The unit pixel of claim 5, wherein the output voltage generation circuit includes:

a second transistor configured to transfer the charge corresponding to the accumulated dark current based on a control signal input from the control circuit; and a third transistor configured to generate the output voltage based on the charge corresponding to the accumulated dark current transferred via the second transistor.

7. The unit pixel of claim 6, wherein the control circuit includes:

a light sensing device configured to activate the control signal when the light signal is detected.

8. The unit pixel of claim 7, wherein the light sensing device corresponds to Geiger-mode Avalanche PhotoDiode (GAPD) or Linear-mode Avalanche PhotoDiode (LAPD).

9. A unit pixel of an image sensor comprising:

an accumulation circuit configured to generate an accumulated leakage current by accumulating a charge corresponding to a leakage current during a time of flight (TOF), the accumulation circuit being initialized at a predetermined cycle;

an output voltage generation circuit configured to generate and output an output voltage corresponding to the TOF based on a charge corresponding to the accumulated leakage current; and a control circuit configured to control an operation of the output voltage generation circuit based on a light signal that is input to the unit pixel after being reflected by an object, the light signal being emitted by a light source.

10. The unit pixel of claim 9, wherein the light source corresponds to an optical pulse emission device, and the light signal corresponds to an optical pulse.

11. The unit pixel of claim 10, wherein the accumulation circuit includes:

a first transistor configured to turn-on at the predetermined cycle to be initialized, the leakage current flowing through the first transistor when the first transistor turns-off; and a photodiode configured to generate the accumulated leakage current by accumulating the charge corresponding to the leakage current.

12. The unit pixel of claim 11, wherein the output voltage generation circuit includes:

a second transistor configured to transfer the charge corresponding to the accumulated leakage current based on a control signal input from the control circuit; and a third transistor configured to generate the output voltage based on the charge corresponding to the accumulated leakage current transferred via the second transistor.

13. The unit pixel of claim 12, wherein the control circuit includes:

a light sensing device configured to activate the control signal when the light signal is detected.

14. The unit pixel of claim 13, wherein the light sensing device corresponds to Geiger-mode Avalanche PhotoDiode (GAPD) or Linear-mode Avalanche PhotoDiode (LAPD).

15. An apparatus comprising:

a pixel array comprising a plurality of unit pixels, wherein each of the unit pixels comprises:

an optically shaded photodiode; and a control circuit configured to initialize the photodiode responsive to a first control signal indicative of transmission of a light pulse and to generate, responsive to a second control signal indicative of receipt of reflected light corresponding to the transmitted light pulse, an output voltage based on a state of the photodiode.

16. The apparatus of claim 15, wherein each control circuit is configured to accumulate a dark current of the photodiode and to generate the output voltage responsive to the accumulation.

17. The apparatus of claim 15, wherein each control circuit is configured to accumulate a leakage current of the control circuit and to generate the output voltage responsive to the accumulation.

18. The apparatus of claim 15, wherein the control circuit is configured to charge a node of the photodiode responsive to the first control signal and, responsive to the second control signal, to charge a capacitor based on a state of the node of the photodiode.

19. The apparatus of claim 18, wherein each control circuit comprises:

an initialization transistor configured to couple the node of the photodiode to a power supply node responsive to the first control signal;

a transfer transistor configured to couple the node of the photodiode to a floating node responsive to the second control signal; and a charging transistor configured to couple the capacitor to the power supply node based on a state of the floating node.

20. The apparatus of claim 15, further comprising a time of flight (TOF) estimating circuit configured to receive the output voltages from the unit pixels.

* * * * *